HENRY H. EAMES, OF ST. PAUL, MINNESOTA.

Letters Patent No. 86,513, dated February 2, 1869.

IMPROVED PROCESS FOR DESULPHURIZING ORES TO OBTAIN THE PRECIOUS METALS.

The Schedule referred to in these Letters Patent and making part of the same.

*To all whom it may concern:*

Be it known that I, HENRY H. EAMES, of St. Paul, in the county of Ramsey, in the State of Minnesota, have invented a new and improved Process for Desulphurizing Ores; and I do hereby declare that the following is a full and exact description thereof, reference being had to the accompanying drawings.

The nature of my invention consists in the use of chlorine-gas, salt, nitrate of soda, and manganese, or other equivalents, forming chlorine, sulphuretted-hydrogen gas, and sulphate of iron, or other equivalents, for precipitating the precious metals from sulphuretted ores.

I have found that sulphuretted ores containing the precious metals, if heated in the ordinary manner, by roasting in a furnace, are dissipated, or carried off, by the action of the draught.

I cause a stream of chlorine-gas to pass through the crushed quartz, and then a stream of water, to moisten and dissolve out the chloride of gold.

I use sulphuretted hydrogen and sulphate of iron, and when silver is present, I amalgamate with mercury.

I also crush and roast the ore, mixed with equal parts of salt, nitrate of soda, and manganese, and amalgamate with mercury.

To enable others to use my invention, I will proceed to describe it, viz:

In any suitable vessels or furnace that can be closed, and to which any desired temperature can be applied, I place a quantity of the sulphuretted crushed ore. I then pass a stream of free chlorine-gas through the mass, until completely saturated, or until a decomposition has taken place, and the precious metals are converted into chlorides. I then pass water into the mass, to carry down the chloride of gold, and precipitate with sulphuretted hydrogen or sulphate of iron, and in this manner obtain the gold.

I have found it advisable to roast the ore after it has been crushed, and to mix common salt, nitrate of soda, and manganese with it, and, when in a heated state, apply free chlorine, as before specified, and then plunge it into a bath of a solution of sulphate of iron, the strength of the solution to be determined by the richness of the ore to be treated. In this state it can be amalgamated in the usual manner.

I have also found it advantageous, in some cases, to mix the ore with salt, nitrate of soda, mercury, and water, in about these proportions, viz:

Ten pounds of salt, ten pounds nitrate of soda, five hundred pounds of mercury, five hundred pounds of water, to one ton of the ore.

I then heat the mass with steam or other suitable means, and also inject a stream of superheated air, at a temperature of 350° Fahrenheit, into the mass, and agitate the whole, until it is desulphurated and amalgamated at the same time.

Although I have described these processes, I do not limit myself to any one of these, but prefer to use one or all, in treating sulphuretted ores, and also the use of the chlorine-gas and sulphate of iron.

What I claim, and desire to secure by Letters Patent, is—

The process for desulphurizing ores, substantially as described.

HENRY H. EAMES. [L. S.]

Witnesses:
P. HEFFERNAN,
THOS. PRENDERGAST.